United States Patent [19]

Shaffer, deceased et al.

[11] 4,138,992

[45] Feb. 13, 1979

[54] VISCOSITY STABILIZED SOLAR PONDS

[76] Inventors: Lloyd H. Shaffer, deceased, late of Stamford, Conn., Dorothy B. Schaffer, executrix, 156 Interval Rd., Stamford, Conn. 06905

[21] Appl. No.: 597,469

[22] Filed: Jul. 21, 1975

[51] Int. Cl.$^2$ .............................................. F24J 3/02
[52] U.S. Cl. .................................. 126/271; 237/1 A; 252/316
[58] Field of Search .............. 126/270, 271; 237/1 A; 252/8.55 R, 316 X, 315; 21/60.5 R, 60.5 A

[56] References Cited

U.S. PATENT DOCUMENTS

| | | | |
|---|---|---|---|
| 2,801,218 | 7/1957 | Menaul | 252/8.55 R |
| 3,077,190 | 2/1963 | Allen | 126/271 |
| 3,372,691 | 3/1968 | Shachar | 126/271 |
| 3,563,305 | 2/1971 | Hay | 126/270 |
| 3,639,258 | 2/1972 | Corino | 21/60.5 A |
| 3,918,904 | 11/1975 | Vartiak | 21/60.5 R |

FOREIGN PATENT DOCUMENTS 308276  8/1971  U.S.S.R. .................................. 126/271

OTHER PUBLICATIONS

A. Rabl and C. Nielsen, "Solar Ponds for Space Heating," Solar Energy, vol. 17, pp. 1-12, Pergamon Press, England, 1975.

*Primary Examiner*—Kenneth W. Sprague
*Assistant Examiner*—James C. Yeung
*Attorney, Agent, or Firm*—Mattern, Ware, Davis & Stoltz

[57] ABSTRACT

A solar pond for collecting solar energy preferably filled with a shallow layer of water over a blackened sunlight-absorbing surface which is in turn in contact with a heat-storage or heat exchanging medium. Convection in the solar pond is inhibited by raising the viscosity of the pond by adding gelling agents, for example, a polyethyleneoxide adduct of a hydrophobic residue. Convection is further inhibited by dividing the pond into cells such that the Rayleigh number of the fluid within the cell structure is less than the critical Rayleigh number at which convection may occur. The dividers may be translucent or transparent generally horizontal sheets or generally vertical sheets, forming matrices which are rectangular, hexagonal or triangular in horizontal cross-sections. Alternatively, the gelled fluid medium of the solar pond may be bagged in translucent elongated bags which when arranged in the pond have their shortest dimension less than that which will support convection. Formulas are given for computing the maximum permissible shortest dimension of the cells of the structures disclosed and a general formula is given for computing this dimension in any configuration. In one embodiment of the invention, the solar pond is merely made shallow enough and viscous enough that convection will not take place.

37 Claims, 7 Drawing Figures

VISCOSITY STABILIZED SOLAR PONDS

SUMMARY OF THE INVENTION

This invention relates to the collection and storage of solar thermal energy by means of viscosity stabilized solar ponds. In particular, the invention relates to the use of a large body of fluid as the collector-storage device. Water, clear oils, synthetic organic solvents, glycols, anti-freeze compositions, and the like may serve as the transparent fluid. The fluid must be clear, non volatile, stable to sunlight, and readily available. A great many substances might serve; however, good quality water is valued at less than 1/1,000th the cost of the cheapest manufactured products, and it therefore seems likely that only systems which are essentially aqueous will come into widespread use. For this reason, the discussion below focuses on aqueous systems, but it should be clearly understood that the principles, the control of the fluid characteristics through the addition of selected solutes and additives, apply in a very general sense to any liquids.

Normally, bodies of water or other low volatile fluids exposed in the sun will gradually become slightly warm at the top and remain cool at the bottom. However, previous investigation has shown that salts can be used to stabilize a temperature inversion in an aqueous pond. H. Tabor and others, have described the stabilization of large aqueous bodies through the addition of salt at the bottom of the pond. See Tabor. H., "Solar Collector Developments", *Solar Energy*, III, No. 3, pp 8-9, (1959), and Tabor. H., "Solar Ponds", *Electronics and Power*, pp 296-299, Sept. 1964. And Tabor has referred to solar heated ponds of this sort, stabilized by means of a density gradient, and used to collect and store solar energy, as solar ponds. Experimentation has shown that a properly designed density gradient pond can support a substantial temperature difference—the order of 100° C. for ponds about one meter deep. See Weinberger, H., "The Physics of the Solar Pond", *Solar Energy*, VIII, No. 4, pp 45–56, (1964).

A disadvantage of the foregoing arrangement is the tendency of diffusion to undo the salt concentration gradient. A further factor which tends to eliminate the needed concentration gradient is evaporation from the surface of the pond. In practice, these problems can be managed by continually adding fresh water at the top of the pond (washing the pond) and supplying salt or freshly saturated salt solution at the bottom. Material balance requires the removal of an intermediate layer in the pond. This may be desirable in any case in connection with the extraction of heat; but, a very delicate adjustment must be maintained in order to insure stable operation.

A further disadvantage of the salt stabilized, density gradient solar pond, is the very large amount of salt needed. Tests showed that sodium chloride is only marginally useful; magnesium chloride works much better. On a weight basis, a saturated solution of magnesium chloride contains about 53 parts of salt per 100 parts of water at 0° C. and 73 parts of salt per 100 parts of water at 100° C. (sodium chloride 36/40 same basis—less soluble and not so sensitive to temperature), and for a pond one meter deep, the quantity of magnesium chloride required per square foot of exposed (collector) surface is approximately 65 kg. (143 lbs.). This salt is typically priced at about 13¢/lb., and clearly, on the basis of the large magnesium chloride inventory alone, the salt stabilized pond is far from being the inexpensive large scale device originally proposed.

It is an object of the present invention to avoid the foregoing disadvantages of large solar ponds by using gelling agents or polymeric thickeners to stabilize the fluid mass. Salts and/or other low molecular weight solutes may be present in connection with requirements for elevation of boiling point pH control, as fungicides, as corrosion inhibitors, as ultraviolet absorbers, and so forth. However, the basic concept of the present invention is stabilization through viscosity control, or gelation of the fluid, rather than through the creation of a substantial density gradient in the pond. In order for the thickened pool to function as an efficient solar energy collector, the thickener and the fluid used must be clear and transparent, and the presence of the thickener must not appreciably alter the light transmission characteristics of the fluid.

A further object of this invention is to provide a collector-storage system suitable for heating a house or cluster of low-rise apartments. In this usage, the dwelling or heated space will surround, or nearly surround, the solar pond. At least 50%, and preferably more, of the pond perimeter will share a common wall with the structure to be heated. In case the building surrounds the pond entirely, suitable glazing—a south wall, or a skylight, or both—must be provided. In the case of a smaller building, the structure cannot really contain the pond but there are enormous advantages to placing an air layer over the top of the pond. This could be accomplished by floating a transparent plastic bag (quilt) on the top of the pond. A similar device might also be used with interior ponds, but it seems superfluous. The building envelope and the heated air within it would serve essentially the same purpose. It is known that fluids confined between walls spaced apart less than a critical distance will not support convection currents; for example, air between sheets of glass spaced apart approximately ¼ of an inch or less will not support convection and thus provides very good thermal insulation qualities. It is also known that this critical dimension increases as viscosity increases.

It is therefore another object of this invention to prevent convection currents in solar ponds through the use of dividing matrices having a spacing of less than the critical dimensions. Other objects of the invention will in part be obvious and will in part appear hereinafter.

The invention accordingly comprises several steps and the relation of one or more of such steps with respect to each of the others thereof and the features of construction, combinations of elements and arrangements of parts which will be exemplified in the methods and constructions hereinafter set forth. The scope of the invention is indicated in the claims.

THE DRAWINGS

The same reference characters refer to the same elements throughout the several views of the drawings.

DETAILED DESCRIPTION

Figure 1:
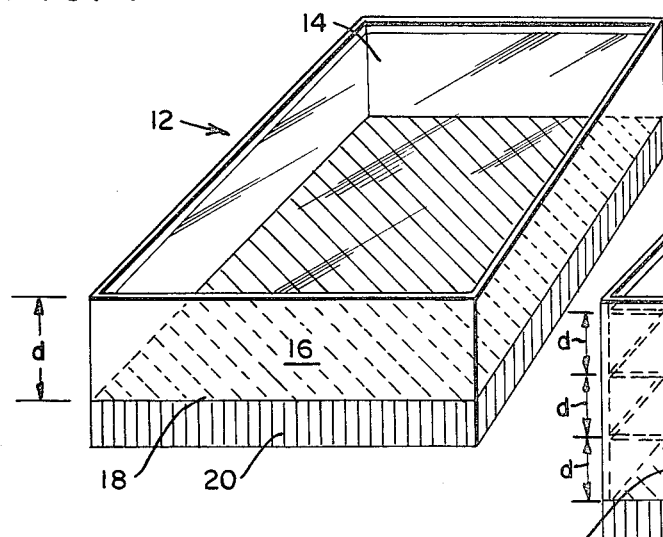
FIG. 1 is a perspective diagrammatic view of a viscosity stabilized solar pond according to my invention.

FIG. 1 is a perspective view of a very simple version of the proposed viscosity stabilized solar pond 12. Light falling on the surface 14 of the thickened clear liquid 16 passes through the liquid layer and is absorbed by the blackened bottom 18 of the pond. The absorption of light produces heat at the bottom of the pond. The vertically hatched section 20 under the black absorber in FIG. 1 is intended to indicate that a mechanism for extracting some of this heat may be provided; however, for the moment, we need not consider the details of this. With any normal fluid in the pond, thermal expansion at the lower heated surface would produce a density decrease at the bottom of the fluid mass, and ordinarily this density decrease would drive convection currents which would tend to carry the heat to the upper surface where it might be lost by radiation, evaporation, conductive transfer to the air mass above, or all three. Normally, it is impossible to maintain a situation in which the bottom of a fluid layer is significantly warmer than the top. However, convection currents cannot be established so long as the product of certain characteristic quantities, the Grashof and the Prandtl numbers, remains below a certain critical value. See E. R. G. Eckert and R. M. Drake, *Heat and Mass Transfer*, 2nd ed., McGraw Hill, N.Y. (1959) p. 328. The Grasshof number is given by:

$$Gr = \frac{d^3 g B \Delta t}{\nu^2}$$

where:
- d = characteristic dimension, the depth of the fluid layer in the case of a layer that has considerable lateral extent.
- g = the acceleration of gravity
- $\Delta t$ = the temperature difference across the layer.
- B = volume coefficient of thermal expansion of the fluid.
- $\nu$ = the kinematic viscosity of the fluid (viscosity/density ratio). The Prandtl number is given by:

$$Pr = \nu/\alpha$$

where:
- $\alpha$ = thermal diffusivity (thermal conductivity divided by specific heat).
- and $\nu$ has the same meaning as above.

The product, Gr × Pr, is sometimes known as the Rayleigh number.

$$Gr \times Pr = \frac{d^3 g B \Delta t}{\nu \alpha}$$

In a fluid layer that has both a top and a bottom cover, this quantity must exceed about 1,700 before natural convection can begin. If the top is not covered (called a "free surface"), the critical value is only about 1,100.

It is instructive to consider the maximum depth of water that is stable against convection when the temperature gradient is 1° C./cm. Using the properties of water near 20° C., and the relationship Gr × Pr = 1,700, the maximum thickness without convection works out to be about 0.6 cm. On the other hand, if we assume that a thickener has been used to raise the viscosity to something like $0.66 \times 10^5$ times its normal value, and also using the properties of water at around 50° C. (more appropriate to the solar collector-storage proposal), then, for the same gradient, the limiting thickness (depth) for convective circulation works out to be a little over 8 cm. An additional 1,000 fold increase in the viscosity will raise this figure to 0.46 meters.

Figure 3:
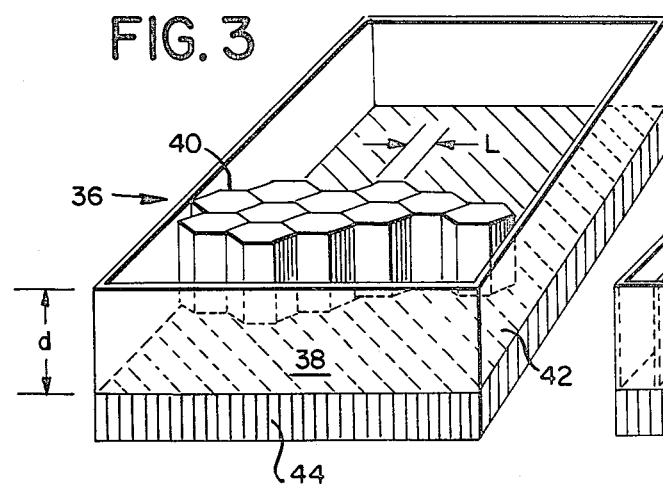
FIG. 3 is a perspective diagrammatic view, a portion thereof being broken away, of another viscosity stabilized solar pond according to my invention.
Figure 4:
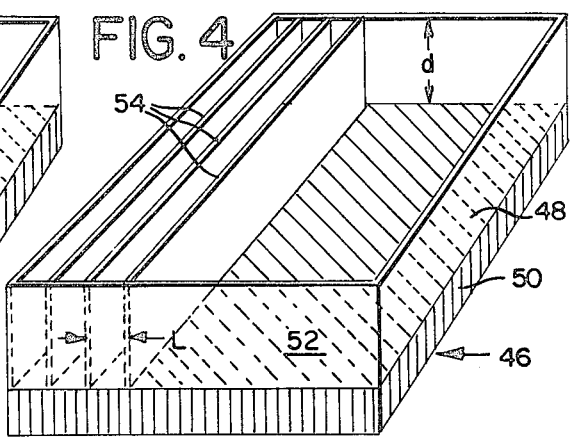
FIG. 4 is a perspective diagrammatic view of another viscosity stabilized solar pond according to my invention.

Materials and techniques which will allow us to increase the viscosities of ordinary thin fluids to $10^6$ centipoises or more are available, and some that are appropriate to thickening water are discussed further below. However, such very high viscosities may present problems in terms of materials handling, quantities of materials needed, the range of materials that may be considered, and so forth. Therefore, in the interest of allowing a proper engineering optimization, the slightly modified forms of the viscosity stabilized pond shown in FIGS. 2, 3 and 4 are proposed.

Figure 2:
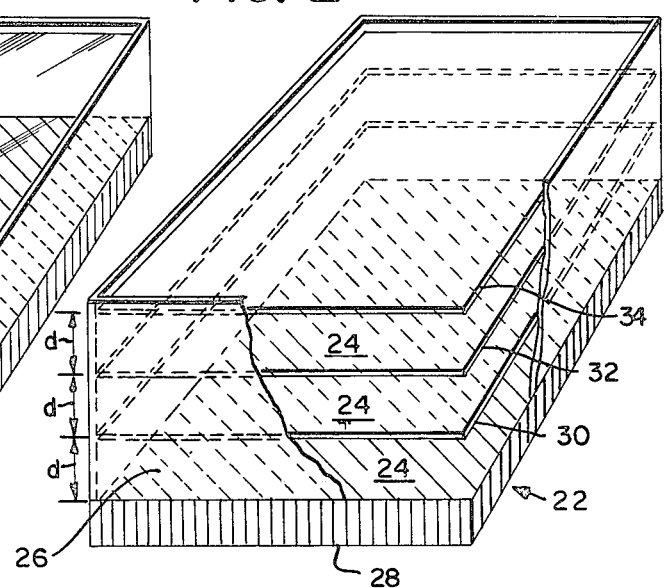
FIG. 2 is a perspective diagrammatic view, a portion being broken away, of a viscosity stabilized solar pond according to my invention.

The pond 22 illustrated in FIG. 2 is filled with a thickened fluid 24, has a black-bottom surface 26 and a heat storage and/or heat transfer mechanism 28 at the bottom just as the solar pond 12 in FIG. 1. Additionally, it is provided with three transparent flat sheets 30, 32 and 34 which divide the pond into three layers each of thickness d. The added sheets 30, 32 and 34 need not be perfectly clear; but under the conditions of use, in contact with the thickened fluid, they must transmit a high proportion of the incident light—preferably over 90% each sheet.

The intermediate sheets 30 and 32 serve primarily to control the onset of convection and it is assumed that they will not greatly affect the conduction of heat from the bottom of the tank to the top. The upper sheet 34 serves a dual purpose: it is part of the convection control system; and, it retards evaporation. If it were not present, or if the evaporation of fluid from the pool were to be controlled by floating a freely movable non-volatile substance on the surface—a layer of high boiling clear oil for example—then the spacing appropriate to the uppermost layer, the depth of the top section of the pool, would have to be calculated using the lower of the two critical Rayleigh numbers.

The control of evaporation is most important in terms of reducing heat loss from the pond surface. However, there are other consequences of evaporation that may also cause concern. The pool may, for example, be operated in a closed space, inside a large house behind a suitably glazed south wall, or under a skylight. Alternatively, one or more of the ingredients of the working fluid might be particularly volatile; if this were the case, evaporation would have to be retarded in order to maintain the composition of the pool.

Control of evaporation does not require the use of an actual preformed sheet in contact with the top surface of the pond. However, if a fluid or movable upper layer—nonvolatile oil or a monolayer of cetyl alcohol for example—is used, then as stated above, the depth of the topmost section must be calculated on the basis of the "free surface" critical number.

In FIG. 2, the lower, vertically hatched portion 28 of the collector-storage system is intended to suggest a mechanism for heat transfer (extraction of energy) at the bottom of the viscosity stabilized pond. It might seem feasible to place coils containing a suitable working fluid in the lower, hottest part of the pond, but this would provide some degree of shading and a preferred method for extracting the heat energy is to make provision for the circulation of either air or water below the absorber surface 24. The former might readily be accomplished by supporting the bottom of the tank on hollow concrete blocks, or on a suitably designed brick checker. A bed of rough stones might also be satisfactory. The depth of brick, concrete, or stone would add to the inherent storage capacity of the thermal gradient pond. Heat would be withdrawn from the bed by circulating air through it.

If the thermal energy is to be extracted by the circulation of a liquid, then the tank would simply be extended some suitable distance below the absorbing sheet. The absorbing sheet would then become also a means for dividing two fluids. The material in the under layer would not be thickened, and it would be circulated as required to carry heat away from the underside of the bottom sheet. Inexpensive storage could be added to the normal capacity of the pond by increasing the depth of the under layer. The physical arrangement is such that the warmest part of the circulating auxiliary storage fluid will be the upper part of the under layer, the portion that is in direct contact with the bottom of the thickened collector-storage pond. Unit heat transfer rates are not expected to present any severe limitations as long as we are considering fairly thin sheets of material having considerable lateral extent.

Given any definite set of overall conditions: i.e., viscosity, temperature difference, pond depth, coefficient of thermal expansion, density and diffusivity, we can use $$\frac{d^3 g B \Delta t}{v \alpha}$$

to calculate a Rayleigh number for the system. If the calculated number is above a critical value (1,700 or 1,100 depending on circumstances) we can expect the pond to circulate; if the characteristic number is less than the critical value, our expectation is that natural forces (buoyancy) will be insufficient to drive convective circulation, and the pond should be stable. Once a particular design objective has been established, and the fluid properties have been fixed, there are really two approaches to using the critical circulation conditions (Rayleigh number) to establish a non-circulating configuration: a configuration such that the pond does not circulate when heated from the bottom so that the bottom is warmer than the top by a preplanned amount, $\Delta t$.

First, we could choose a total depth, d, shallow enough to prevent circulation: i.e., $$R = 1,700 = \frac{d^3 g B \Delta t}{v \alpha}$$

(1,100 if upper surface free)

And this may be acceptable if $\Delta t$ is to be rather small, 10° C. say, and if at the same time we can find ways to thicken the pool to achieve a viscosity of about $10^3$ poise ($10^5$ centipoise). Under these circumstances, a depth of 11 cm or a little less would be satisfactory for inhibiting natural convection. This situation is illustrated in FIG. 1, and FIG. 2 is a variation on it. Perhaps we will be unable to attain a viscosity as high as is specified above, or alternatively, we may desire a $\Delta t$ closer to 50° C. rather than only about 10° C.; then to limit the circulation, we could subdivide the total depth of the pond into a series of layers, each calculated to have a depth "d" just less than the vertical spacing needed to permit circulation. In performing this calculation, both the total depth and the total $\Delta t$ must be divided up into appropriate fractions of the whole; and, the "d" and the "$\Delta t$" associated with each layer must be used with the other appropriate fluid characteristics to establish a non-convecting design. Actually, if the temperature gradient is linear, we can use $$R = 1,700 = \frac{d^3 g B \Delta t}{v \alpha} = \frac{d^3 g B (d \times \text{grad } t)}{v \alpha} = \frac{d^4 g B (\text{grad } t)}{v \alpha}$$

(1,100 if upper surface free)

to establish the depth needed for each layer.

$$\text{Thus, } d = \sqrt[3]{\frac{R \text{ critical } v \alpha}{g B \Delta t}} \text{ or } d = \sqrt[4]{\frac{R \text{ critical } v \alpha}{g B (\text{grad } t)}}$$

A second approach to the use of the critical condition to limit circulation is to calculate the R associated with any arbitrary design and then use this R to design a critical lateral cell which is as small as, or preferably smaller than the natural circulation cell that would be associated with the calculated number. In doing this, we're really raising the minimum buoyancy required for flow by introducing a planned amount of viscous drag. That is, once the limiting lateral cell is in place, we can expect the pond to be stable (non-convecting) as long as the Rayleigh number used in designing the cell is not exceeded.

It may not always be convenient to limit the pond depth or to subdivide the pond with horizontal sheets. There are other configurations which will inhibit natural convection—see for example, FIGS. 3 through 7. When convection first develops in a fluid layer heated from the bottom, a cellular sort of flow pattern is set up. When the depth, temperature, viscosity relationship is appropriate to the onset of convection, the width of the natural cells tends to be the order of twice the depth as calculated from the critical Rayleigh numbers mentioned above. Dividers placed vertically in the fluid layer will inhibit circulation just as effectively as the horizontal sheets which limit the thickness of the layer. Given any set of fluid characteristics, a depth, and a temperature difference, we can always calculate a characteristic Rayleigh number. And, associated with each Rayleigh number equal to or above the critical minimum there will be a small circulation cell. As the Rayleight numbers increase, the lateral dimensions of the minimum cells associated with circulation become smaller. By adding vertical barriers with a limited lateral repeat distance, we can force the Rayleigh number appropriate to circulation to be much higher than the value that would naturally prevail for a fluid layer of indefinite lateral extent.

Referring to FIG. 3, a solar pond 36 containing a viscous fluid 38 has a depth d and is divided into hexagonal cells by means of the hexagonal matrix divider 40 which may be formed of suitable transparent material such as plastic. Each face of the hexagonal cell has a lateral dimension L. The pond is provided with the usual solar energy absorbing bottom surface 42 and heat storage or a transfer mechanism 44.

The solar pond 46 illustrated in FIG. 4 similarly is provided with the blackened bottom surface 48, heat storage or transfer device 50 and is filled to a depth d with a thickened fluid 52. In pond 46, convection is inhibited by dividing the pond up into elongated lateral cells by means of vertical dividers 54 which are spaced apart a distance L. The dividers may be of any suitable radiation transmitting material such as a plastic film or the like.

Figure 5:
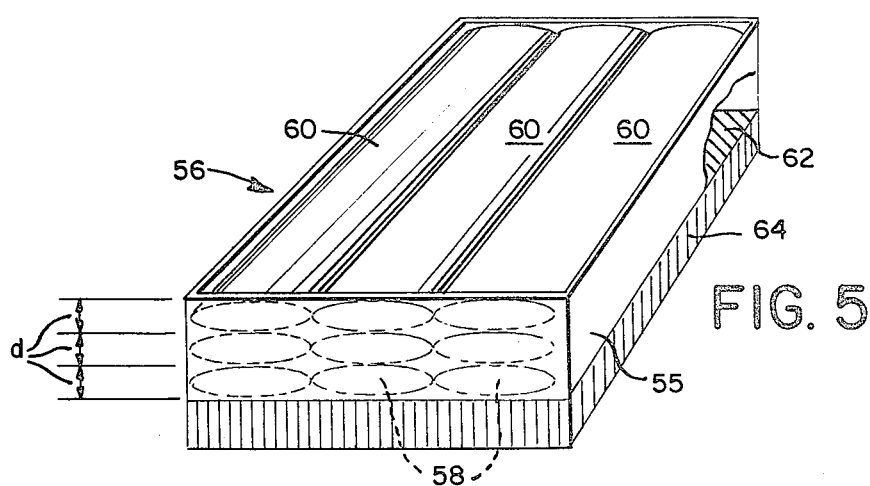
FIG. 5 is a perspective diagrammatic view of another solar pond according to my invention.

In the solar pond 56 of FIG. 5, the viscous fluid 58 is contained with an elongated plastic bag 60 of suitable radiation transmitting material. The critical dimension in solar pond 56 is the dimension d of the bags, the smallest dimension across them as will be explained below. The pond is provided with a heat absorbing surface 62 and heat storage or heat transfer device 64 as previously explained.

Figure 6:
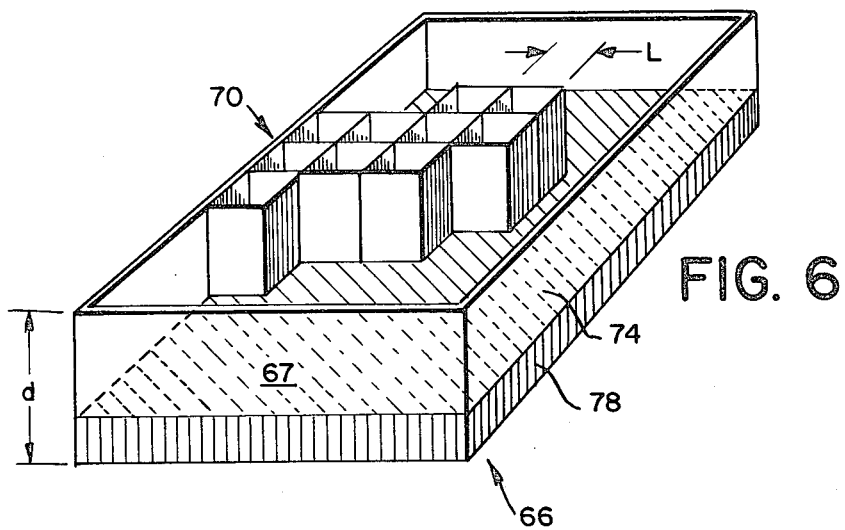
FIG. 6 is a perspective diagrammatic view, a portion thereof being broken away, of another solar pond according to my invention.
Figure 7:
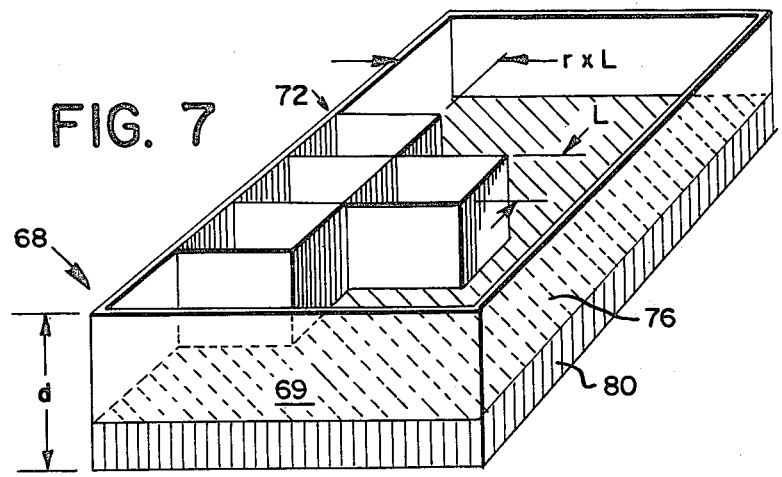
FIG. 7 is a perspective diagrammatic view of another viscosity stabilized solar pond according to my invention.

FIGS. 6 and 7 are illustrative of the concepts discussed below. In these Figures, solar ponds 66 and 68 are filled with gelled fluid 67 and 69 and divided into rectangular, vertical walled matrices as generally indicated at 70 and 72 respectively. It is understood that these matrices are of suitable radiation transmitting material such as plastic and are located in a solar pond having a radiation absorbing lower surface 74 and 76 respectively and each storage or heat transferring devices 78 and 80.

Referring to FIG. 6, the square cell shown therein has a dimension L on each side. Referring to FIG. 7, the rectangular cells shown therein has a dimension L on the short side and a dimension r × L on the sides perpendicular thereto.

The general problem of cellular circulation in a fluid layer heated from the bottom has been very extensively studied. It turns out that the characteristic lateral dimensions of the repeating cells are directly proportional to the depth of the layer and inversely proportional to dimensionless parameter "a" which increases as the Rayleigh number increases. The table which follows relates the "a" Rayleigh number to the dimensionless parameter for both the free surface (uncovered) and the non-slip boundary (covered) cases. See Chandrasekhar, S., *Hydrodynamic and Hydromagnetic Stability*, Oxford University Press, Oxford (1961). Chapter 2.

TABLE 1

| CRITICAL PARAMETERS, Both Surfaces Covered | |
|---|---|
| R | "a" |
| 1,707.8* | 3.117 |
| 1,879.3 | 4.00 |
| 2,439.3 | 5.00 |
| 3,418.0 | 6.00 |
| 4,918.5 | 7.00 |
| 7,084.5 | 8.00 |

*minimum R, critical value for indefinite lateral extent.

TABLE 2

| CRITICAL PARAMETERS, One Surface Free | |
|---|---|
| R | "a" |
| 1,100.6₅* | 2.682₅ |
| 1,120.8 | 3.00 |
| 1,223.5 | 3.50 |
| 1,528.8 | 4.00 |

*minimum R, critical value for indefinite lateral extent.

The numerical factors which permit a direct connection between the "a" parameter and the actual lateral dimensions depend on the geometrical form of the repeating lateral cells. Three cell plans have received extensive theoretical and practical treatment:

I. Parallel Vertical Walls
II. Square Cell
III. Hexagonal Cell (Equilateral Triangle is special case of Hexagonal pattern) The results obtained may be summarized as follows, where "d" is the depth of the circulating cell, and the values of "a" are to be selected from the table above in accordance with a calculation of the Rayleigh number and a determination of whether both surfaces are non-slip or one is free.

I. Parallel Vertical Walls:
   L (FIG. 4) (minimum lateral distance which will permit natural convection cell to form under conditions specified) = 2 π d/a II. Square Cell:
   L (FIG. 6) (side of minimum cell which will permit natural convection pattern) = 2 √2 π d/a III. Hexagonal Cell:
   L (FIG. 3) (side of minimum cell which permits circulation) = 4/3 π d/a (The side of the minimum equilateral triangle is √3 L calculated for the hexagon, this makes the altitude come out the same as the critical spacing for the parallel walls case above.) Rectangles other than squares can be specified using the following notation:

Let L (FIG. 7) be the short side of the rectangle, and let r × L, r ≧ 1, be the long side. Then:
   L (length of short side consistent with natural convection)

$$= \sqrt[2]{\frac{1 + r^2 \pi d}{r \, a}}$$

This last result actually includes cases I and II above. When r > 1, we'll recover the expression for parallel vertical walls, and when r = 1, (square) we'll obtain the expression appropriate to the square. This is obvious from the results published by Pellew & Southwell, and by Chandrasekhar, and by ohters. See Pellew, Anne, and Southwell, R. V., Proc. Roy. Soc., Series A 176, 312–343, (1940). (There is a misprint (factor of π 2) in equation 61 in this paper).

For all of these systems, if real boundaries that approach the size of the natural cell are added, the convective circulation will be inhibited. Or, to look at it another way, the minimum Rayleigh number needed for convection to occur will be driven up to artificially high values if we introduce closely spaced lateral boundaries. In actual tests, Heitz and Westwater found that the critical Rayleigh number associated with square cells rose from approximately $2 \times 10^3$ when the depth was half the width, to approximately $3 \times 10^5$ when the depth was four times the width. See Heitz, W. L., and Westwater, J. W., Trans. of ASME (J. of Heat Transfer), May 1971, 188-196.

There may be practical reasons for using hexagons or triangles as the plan figure for the vertical dividers. Structural considerations, the efficient use of materials and the like may be important. And further, less easily described geometrical shapes designed to fill the plane might also be chosen, perhaps because they are easy to handle or assemble. The important consideration in terms of interfering with natural convection is that the width of the figure should be the order of twice the depth $\times \pi/a$, where "a" is to be taken from the table above. The system of dividers, whether cellular (FIGS. 3, 6 and 7), horizontal (FIG. 2), or vertical spacers (FIG. 4) must have excellent light transmission characteristics. Further, as has been noted, a vapor barrier across the top of the whole pond is highly desirable.

FIG. 5 shows a further variation of the basic ideas already presented. In this concept, the high viscosity fluid 58 is to be bagged in transparent containers 60 which will then be stacked in a suitable crib or tank 55 to form the solar pond 56. Two of the principal dimensions of the bags might be very large as long as the other is sufficiently small to inhibit circulation under the design conditions. It seems most likely that the bags will be made wide and long and that to inhibit circulation, the height of the bags "d" will have to be limited in accordance with the critical Rayleigh number for a fluid layer of indefinite lateral extent. That is, the height of each bag will be more or less the same as the vertical spacing that would have been chosen for the horizontal sheets shown in FIG. 2.

Bagged high viscosity fluids as envisaged here should not be confused with the transparent water bags used in the patented SKYTHERM system developed by Harold Hay of Phoenix, Ariz. In this SKYTHERM system, and in other concepts that are currently under study, the water or other fluid is used for its thermal mass and/or possibly its infra-red opacity (depending on the design and purpose of the system). However, it is allowed to convect freely; and in some concepts it is even pumped from storage to the shallow pond and back again, a procedure that would require prohibitive amounts of energy if the viscosity were the order of 100,000 centipoises or more!

A great variety of thickening agents and techniques are available for thickening the fluid that is to be used in the viscosity stabilized or gelled solar pond. High polymers dissolved in the fluid can produce substantial viscosity increases at relatively modest concentrations. Alternatively, two inherently fluid but immiscible substances, oil and water, can be made to exhibit the characteristics of a gel if combined and emulsified in appropriate proportions along with suitable low or moderate molecular weight emulsifying agents. In addition, fluid bodies can be gelled using certain medium molecular weight polymers which have substantial segments that are respectively oil soluble and water soluble. The principal requirements for the purpose at hand are that the gelled bodies should be exceptionally clear, capable of transmitting most of the light that falls on them, that they retain their thickened consistency at temperatures of 40° C. and preferably above, and finally, in the interest of conserving the heat absorbed by the blackened receiver, they should have a high infra-red absorbance and a poor thermal conductivity. Descriptive examples of three kinds of gels which are more than 50% aqueous follow below.

The formulation and preparation of transparent mineral oil/water gels has been described by W. R. Markland, D. F. Doca and P. Tusa, U.S. Pat. No. 3,228,842; Jan. 11, 1966; assigned to Chesebrough-Pond's Inc. A transparent gel that solidifies just below 60° C. has the following formulation: mineral oil (visc. 90 Saybolt seconds) 20%; ethoxylated hydrogenated lanolin (20 mol ethylene oxide adduct) 15%; ethoxylated oleylcetyl (7:3) alcohols (4 mol ethylene oxide adduct) 10%; preservative and/or other minor ingredients as needed—typically less than 2%; water to make 100%—53 to 55% depending on usage of minor ingredients. The gel is prepared by mixing the oil, the emulsifiers and the preservative and heating these with stirring to about 77° C. Water, preheated to this temperature, is added slowly with stirring and the resulting mixture is cooled with stirring to about 60° C. Water lost during cooling is added at this point and after stirring, the mixture is poured out and allowed to solidify.

The variety of polymeric agents that may be used to gel aqueous bodies is truly astonishing. Natural materials such as gum arabic, locust bean gum, algin, starch, and gelatin are potentially useful for the present purpose if sufficiently refined and clarified. Further there is a large class of semi-synthetic materials, the principal articles of commerce being water soluble derivatives of cellulose and of starch. And finally, there are purely synthetic materials such as polyvinyl pyrrolidone, polyvinyl alcohol, carboxy vinyl polymer, polyacrylic acid, polyacrylamide, ethelene oxide polymers, and no doubt others. The list above is not meant to be limiting but merely illustrative. A more extensive but still brief listing and discussion of gums and thickeners can be found in Kirk-Othmer, *Encyclopedia of Chemical Technology*, 2nd Ed'n., Vol. 10, Wiley, N.Y. (1966) p.241 and following.

Plant gums and mucilages have been known and used in industry and commerce for thousands of years in various parts of the world. The ancient Egyptians used gums as glue for coating linens employed in clothing corpses for embalming, and also utilized gum arabic as an adhesive for mineral pigments in paint formulations. Historical records likewise show the utilization of various seaweed gums for food and medicinal purposes by many coastal inhabitants of Africa, Asia, Australia, as well as western Europe.

Originally the term "gum" was probably applied to natural plant exudates which had oozed from tree barks and hardened upon exposure to air. This designation also covers water-insoluble resins, rubber, latex, and chicle, as well as water-soluble substances. This semantic ambiguity has persisted down to the present time and even today many of the water-insoluble resins used in the paint and chemical industry are incorrectly referred to as "gums". With the advancement of science and technology, an effort has been made to standardize and clarify the meaning of this word.

Today the accepted technical definition of "gum" refers to any material that can be dissolved or dispersed in water to give viscous or mucilaginous solutions or dispersions. This criterion of water dispersability covers the large majority of gum materials encountered in industry. The artificial distinction between "gums" and "mucilages" has been eliminated since it was found that the category of "mucilages" had no chemical significance and only served to confuse the issue.

The term "gum" is used in industry today to include plant mucilages, and generally refers to plant materials and derivatives which are dispersible in hot or cold water to produce viscous mixtures or solutions. Included in this category are the water-soluble or water-swellable derivatives of cellulose and starch, and the derivatives and modifications of other polysaccharides which are insoluble in the natural form. Included are also certain protein substances, such as gelatin and casein and their derivatives, which have the properties of water solubility and viscosity. In addition the creation of new organic polymers has yielded a whole group of new, completely synthetic gums, such as vinyl polymers, acrylic acid polymers, and ethylene oxide polymers. In the future, many new, tailor-made gums designed for specific applications will undoubtedly be synthesized and will probably replace many natural gums.

A convenient classification scheme consists, therefore, of the following three major groups of gums:

1. Natural gums—found in a natural state, such as the tree exudates or seaweed hydrocolloids.
2. Modified (semisynthetic) gums—chemically modified natural gums or derivatives of naturally occurring materials, such as cellulose or starch.

ment of Commerce, reasonable estimates as to quantity and value may be made. Figures for 1963, shown in Table 4, indicate an annual consumption of 71,000,000 lb of natural gums with a market value of about $30,000,000(3). If the common seaweed gums (agar, algin, carrageenan, and furcellaran) were also included, this would add up to a total of about 90,000,000 lb with a market value of approximately $50,000,000. The market for these natural gums has been increasing steadily despite pressures from synthetic products, and it is believed that, as additional applications for gums are found, the markets for both natural and synthetic gums will grow simultaneously.

TABLE 4
MARKET VALUES AND MAJOR APPLICATIONS OF NATURAL GUMS(3)

| Gum | $/lb | Value$^a$ | Major applications | Quantity$^b$ |
|---|---|---|---|---|
| arabic | 0.25 | 5.2 | beer, confectionery, lithography | 21.0 |
| ghatti | 0.47 | 0.4 | wax emulsions | 0.8 |
| guar | 0.30 | 7.8 | paper, drilling muds, ore flotation | 26.0 |
| karaya | 0.51 | 5.1 | denture powders, laxatives, textiles, paper | 10.0 |
| larch | 0.75 | 0.8 | lithography | 1.0 |
| locust bean | 0.34 | 2.7 | paper, ice cream, textiles | 8.0 |
| psyllium seed | 0.35 | 1.0 | cosmetics, textiles, laxatives | 3.0 |
| tragacanth | 1.50 | 7.2 | pharmaceuticals, salad dressings, dietetic foods | 1.6 |
| total | | 30.2 | | 71.4 |

$^a$Millions of dollars based on average value of sales for 1963
$^b$Millions of pounds in 1963

3. Synthetic gums—completely synthesized chemical products, such as polyvinylpyrrolidone or ethylene oxide polymers.

Table 3 lists the more common gums used in industry today. Many other gums are known and are commercially available, but are not important enough to be included in a general discussion. This discussion is confined to the important natural plant gums, including the tree exudates, and the seed and root gums. But Hydrocolloids and Seaweed colloids could be used. An excellent discussion of the uses and applications and of the technology of the more important water soluble gum, semisynthetics and synthetics can be found in: Robert L. Davidson and Marshall Sittig, Eds. *Water-Soluble Resins*, Reinhold, N.Y. (1962).

On the basis of cost, availability of suitable grades, control of properties, etc., the semi-synthetics appear to present an excellent practical compromise for use in thickening viscosity stabilized solar ponds. Starch derivatives and the like are expected to have inadequate hydrolytic stability, but the cellulose derivatives—carboxymethylcellulose, methylcellulose, hydroxypropylmethylcellulose, hydroxypropylcellulose, hydroxyethylcellulose, and ethylhydroxyethylcelluose—are outstanding in this respect. Among the semi-synthetic cellulosics, carboxymethylcellulose, methylcellulose, and modified methylcelluloses (hydroxyproylmethylcellulose) are preferred because of their superior chemical durability and hydrolytic stability. The solubility of the various methylcelluloses is somewhat limited at temper-

TABLE 3
CLASSIFICATION OF GUMS

| Natural | Modified (semisynthetic) | Synthetic |
|---|---|---|
| plant exudates | cellulose derivatives | vinyl polymers |
| arabic | carboxymethylcellulose | polyvinylpyrrolidone |
| tragacanth | methylcellulose | polyvinyl alcohol |
| karaya | hydroxypropylmethylcellulose | carboxyvinyl polymer |
| ghatti | hydroxypropylcellulose | acrylic polymers |
| seed or root | hydroxyethylcellulose | polyacrylic acid |
| locust bean | ethylhydroxyethylcellulose | polyacrylamide |
| guar | starch derivatives | ethylene oxide polymers |
| psyllium seed | carboxymethylstarch | |
| quince seed | hydroxyethylstarch | |
| seaweed extracts | hydroxypropylstarch | |
| agar | microbial fermentation gums | |
| algin | dextran | |
| carrageenan | polysaccharide B-1459 | |
| furcellaran | others | |
| others | low-methoxyl pectin | |
| pectin | propylene glycol alginate | |
| gelatin | triethanolamine alginate | |
| starch | carboxymethyl locust bean gum | |
| larch gum | carboxymethyl guar gum | |

The utilization and true value of the natural gums in industry is difficult to ascertain, mainly because many of the applications are trade secrets and are not widely publicized. However, since most of the gums are imported and as such are recorded by the U.S. Department atures ranging from about 60° to 90° C. depending on the particular grade. However, for the space heating purpose that is envisaged as part of this application, an upper temperature limit in the range from 60° to 90° C. should be perfectly satisfactory. Concentrations between 0.5 and 5% will be needed.

Among the synthetic polymers, the carboxyvinyl polymer manufactured by B. F. Goodrich Co. appears to be specially attractive as the vehicle to support further preliminary research and development on the viscosity stabilized solar pond.

As has already been mentioned, the principal requirements are clarity and maintenance of gel structure at elevated temperature. And a carboxyvinyl polymer manufactured by the B. F. Goodrich Co. is a preferred material. A particular grade known as CARBOPOL 940 is particulary well known for the clear gels that it forms. A 1.0% solution, neutralized to pH 7 or even slightly alkaline, will have a room temperature viscosity of about 65,000 centipoises. The thermal characteristics of aqueous CARBOPOL solutions are excellent, but, like many other natural and synthetic resins, the carboxyvinyl polymers are sensitive to the ultra-violet radiation in strong sunlight. The manufacturer suggests that an effective sunscreen can be built into CARBOPOL gels using a combination of the sodium salt of ethylene diamine tetra-acetic acid and a commercial ultra-violet absorber, CYASORB UV-284 (American Cyanamid Company). The two compounds are to be used at the rate of one percent of each based on the weight of dry resin in the gel. There are, of course, other methods for dealing with the deleterious effects of sunlight: this is a problem that affects almost every natural and synthetic organic compound to some significant degree.

Still another method for forming aqueous gels involves the use of poly(ethylene oxide) adducts of hydrophobic materials. Two such materials which have been used to form clear gels are ARLATONE G (polyoxyethylene fatty glyceride, ICI America, Inc.) and compounds known as PLURONICS (block copolymers of ethylene oxide condensed on hydrophobic bases formed by condensing propylene oxide with propylene glycol, BASF Wyandotte). In the latter group, a very wide range of molecular weights and ethylene oxide/propylene oxide ratios are available. It is reported that the products numbered in the 90s and 100s form clear gels with water when the resin content ranges from 30 to 90%. One particular composition in the series offered, F 127, is reported to form clear gels in water when used at the 20% level.

It will thus be seen that the objects set forth above, among those made apparent from the preceding description, are efficiently attained and, since certain changes may be made in carrying out the above methods or in the above constructions without the parting from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

Having described my invention, what I claim as new and desire to secure by Letters Patent is:

1. The method of viscosity stabilization in a fluid solar pond comprising the steps of:

A. adding a soluble thickening, but non-solidifying, agent to the fluid in the pond; and, B. dividing the pond into cells having a critical transverse dimension less than that required to permit any substantial heat-induced convection in the fluid within the cells.

2. The method of stabilizing a solar pond utilizing a working fluid containing a convection suppressing agent comprising dividing the pond into cells, a transverse dimension of said cells in at least one direction being smaller than the transverse dimension in the same direction of convection cells normally formed in said fluid when subjected to a temperature inversion, whereby any substantial heat-induced convection within the cells is suppressed.

3. The method defined in claim 2 wherein said transverse dimension is vertical.

4. The method defined in claim 2 wherein the depth of said cells is less than or equal to $$\sqrt[4]{\frac{R \text{ critical } \nu\alpha}{gB(\text{grad } t)}}$$

where:

R critical is the critical Rayleigh number of the fluid in each respective one of said cells; $\nu$ is the kinematic viscosity of the fluid in the pond; $\alpha$ is the thermal diffusivity of the pond; g is the acceleration of gravity; B is the volume coefficient of thermal expansion of the fluid in the pond; and grad t is the temperature gradient in the pond.

5. The method defined in claim 2 wherein said transverse dimension is horizontal.

6. The method defined in claim 2 wherein said cells have horizontal transverse dimensions of L and r × L, where r is greater than or equal to 1, and a depth "d" related to each other by the equation $$L \leq 2\pi \frac{\sqrt{1 + r^2}}{r} \frac{d}{a}$$

"a" being a dimensionless characteristic parameter related to the Rayleigh number of said fluid body by the following table when the upper surface of said fluid is covered by a non-slip surface

| R | "a" |
|---|---|
| 1,707.8 | 3.117 |
| 1,879.3 | 4.00 |
| 2,439.3 | 5.00 |
| 3,418.0 | 6.00 |
| 4,918.5 | 7.00 |
| 7,084.5 | 8.00 | or if the upper surface of said fluid is free

| R | "a" |
|---|---|
| 1,100.65 | 2.6825 |
| 1,120.8 | 3.00 |
| 1,223.5 | 3.50 |
| 1,528.8 | 4.00 |

7. The method defined in claim 6 wherein said cells comprise at least two elongated cells formed by parallel generally vertically disposed walls wherein the distance between said parallel walls "L" is less than or equal to $2\pi d/a$.

8. The method defined in claim 6 wherein said cells are square in horizontal cross-section, the sides of squares being less than or equal to $$\frac{\sqrt{2\pi d}}{a}.$$

9. The method defined in claim 6 wherein said cells are hexagonal in horizontal cross-section, the length of each side of said hexagons being less than or equal to $4/3 \, \pi \, d/a$.

10. The method defined in claim 6 wherein said cells are triangular in horizontal extent and the dimension of the sides of said triangles are less than or equal to $4/3 \, \sqrt{3 \, \pi \, d/a}$.

11. The method defined in claim 2 wherein the upper surface of the fluid in said cells is free and said transverse dimension is small enough to reduce the Rayleigh number of said fluid to less than 1,100.65.

12. The method defined in claim 2 wherein the upper surface of the fluid in said cells is covered by a non-slip surface and said transverse dimension is small enough to reduce the Rayleigh number of said fluid to less than 1,707.62.

13. The method defined in claim 2 wherein said cells are formed by containing said fluid in elongated light transmitting bags of a depth less than either their width or length.

14. The method of viscosity stabilization in a substantially transparent solar pond utilizing an aqueous working fluid comprising adding a transparent soluble thickening agent to the pond.

15. The method defined in claim 14 further defined in that said thickening agent comprises at least one water soluble synthetic polymer and said pond is not an emulsion.

16. The method defined in claim 15 further defined in that said water soluble synthetic polymer is selected from the group consisting of vinyl polymers, acrylic polymers, and polymers of ethyleneoxide.

17. The method defined in claim 16 wherein said water soluble synthetic polymer is an acrylic polymer.

18. The method defined in claim 16 in which said water soluble synthetic polymer is a polymer of ethyleneoxide.

19. The method defined in claim 16 further defined in that said water soluble polymer is a high molecular weight carboxy vinyl polymer.

20. The method defined in claim 15 further defined in that said thickening agent is selected from the group consisting of water soluble chemical derivatives of cellulose and starch.

21. The method defined in claim 15 further defined in that said thickening agent is selected from the group of thickening agents derived from animal or vegetable material.

22. The method defined in claim 21 wherein said thickening agent is an extract of seaweed.

23. The method defined in claim 21 further defined in that said thickening agent is selected from the group consisting of vegetable gums, vegetable extracts, extracts of seaweed, extracts of starch, and extracts of gelatin.

24. The method defined in claim 14 further defined in that said thickening agent is a polyethyleneoxide adduct of a hydrophobic residue.

25. The method defined in claim 14 and the additional step of limiting the depth of the pond to less than that required to permit any substantial heat-induced convection.

26. The method defined in claim 25 wherein said depth is less than or equal to $$\sqrt[4]{\frac{R \text{ critical } \nu\alpha}{gB(\text{grad } t)}}$$

where:
$R$ critical is the critical Rayleigh number of the pond; $\nu$ is the kinematic viscosity of the fluid in the pond; $\alpha$ is the thermal diffusivity of the pond; g is the acceleration of gravity; B is the volume coefficient of thermal expansion of the fluid in the pond; and grad t is the temperature gradient in the pond.

27. The method defined in claim 14, further defined in that said soluble thickening agent is a non-solidifying agent, and said pond remains fluid.

28. A viscosity stabilized solar pond comprising:
A. a large fluid body shallow in depth compared with its lateral extent
   a. deployed to receive and collect sunlight,
   b. said fluid body being substantially transparent to sunlight;
B. a large vessel having a blackened light-absorbing bottom for containing said fluid body;
C. means for withdrawing heat from the warmer lower part of said fluid body; and
D. at least one thickening agent added to said fluid body to stabilize the same against any substantial circulation due to natural heat-induced convection resulting from the heat generated by the absorption of light at the bottom, said agent being substantially uniformly dispersed throughout the fluid and not substantially reducing the sunlight transmisivity of the fluid body.

29. The solar pond defined in claim 28, and:
E. at least one generally vertically disposed wall in said pond dividing it into at least two cells having horizontal dimensions of L and r × L where r is greater than or equal to 1 and a depth "d" related to each other by the equation $$L \leq 2\pi \frac{\sqrt{1+r^2}}{r} \frac{d}{a}$$

"a" being a dimensionless characteristic parameter related to the Rayleigh number of said fluid body by the following table when the upper surface of said fluid is covered by a non-slip surface

| R | "a" |
|---|-----|
| 1,707.8 | 3.117 |
| 1,879.3 | 4.00 |
| 2,439.3 | 5.00 |
| 3,418.0 | 6.00 |
| 4,918.5 | 7.00 |
| 7,084.5 | 8.00 | or if the upper surface of said fluid is free

| R | "a" |
|---|-----|
| 1,100.65 | 2.6825 |
| 1,120.8 | 3.00 |
| 1,223.5 | 3.50 |

| R | "a" |
|---|---|
| 1,528.8 | 4.00 |

30. The solar pond defined in claim 29 wherein said cells comprise at least two elongated cells formed by parallel generally vertically disposed walls wherein the distance between said parallel walls "L" is less than or equal to $2\pi d/a$.

31. The solar pond defined in claim 29 wherein said cells are square in horizontal cross-section, the sides of squares being less than or equal to $2\sqrt{2}\pi d/a$.

32. The solar pond defined in claim 29 wherein said cells are hexagonal in horizontal cross-section, the length of each side of said hexagons being less than or equal to $4/3 \pi d/a$.

33. The solar pond defined in claim 29 wherein said cells are triangular in horizontal extent and the dimension of the sides of said triangles are less than or equal to $4/3 \sqrt{3} \pi d/a$.

34. The solar pond defined in claim 28 wherein the Rayleigh number of said fluid body is less than 1,100.65.

35. The solar pond defined in claim 28 and E a solar light transmitting cover over and in contact with said fluid body and wherein the Rayleigh number of said fluid body is less than 1,707.62.

36. The solar pond defined in claim 28, and;
   E. at least one generally horizontal light transmitting divider in said pond dividing said fluid body into at least two cells, each of a depth less than or equal to $$\sqrt[4]{\frac{R \text{ critical } \nu\alpha}{gB(\text{grad } t)}}$$

where:
$R$ critical is the critical Rayleigh number of the fluid in each respective one of said cells; $\nu$ is the kinematic viscosity of the fluid in the pond; $\alpha$ is the thermal diffusivity of the pond; g is the acceleration of gravity; B is the volume coefficient of thermal expansion of the fluid in the pond; and grad t is the temperature gradient in the pond.

37. The solar pond defined in claim 36 further defined in that said fluid in said pond is contained in light transmitting bags, of a depth less than their width or length.

* * * * *

UNITED STATES PATENT AND TRADEMARK OFFICE
CERTIFICATE OF CORRECTION

PATENT NO. : 4,138,992
DATED : February 13, 1979
INVENTOR(S) : Lloyd H. Shaffer

It is certified that error appears in the above-identified patent and that said Letters Patent are hereby corrected as shown below:

Page 1, line 6, cancel "Schaffer" and insert --Shaffer--;

Page 1, line 6, cancel "Interval" and insert --Intervale--;

Column 6, line 58, cancel "leight" and insert --leigh--;

Column 8, line 43, cancel "ohters" and insert --others--;

Column 14, line 60, cancel "1,100.65" and insert --$1,100.6_5$--;

Column 14, line 60, cancel "2.6825" and insert --$2,682_5$--;

Column 16, line 68, cancel "1,100.65" and insert --$1,100.6_5$--;

Column 16, line 68, cancel "2.6825" and insert --$2.682_5$--.

Signed and Sealed this

Fourth Day of December 1979

[SEAL]

Attest:

SIDNEY A. DIAMOND

Attesting Officer     Commissioner of Patents and Trademarks